(12) United States Patent
Dallal et al.

(10) Patent No.: US 10,476,647 B2
(45) Date of Patent: Nov. 12, 2019

(54) COHERENCE BASED PRE-DECODING PRUNING FOR CONTROL CHANNEL PROCESSING

(71) Applicant: QUALCOMM Incorporated, San Diego, CA (US)

(72) Inventors: Yehonatan Dallal, Kfar Saba (IL); Gideon Shlomo Kutz, Ramat Hasharon (IL); Shlomo Hoory, Giv'at Ada (IL)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 15/473,157

(22) Filed: Mar. 29, 2017

(65) Prior Publication Data

US 2018/0115968 A1    Apr. 26, 2018

Related U.S. Application Data

(60) Provisional application No. 62/412,744, filed on Oct. 25, 2016.

(51) Int. Cl.
*H04W 72/04* (2009.01)
*H04L 5/00* (2006.01)

(52) U.S. Cl.
CPC .................... *H04L 5/0053* (2013.01)

(58) Field of Classification Search
CPC .......................... H04W 72/04; H04W 72/08
See application file for complete search history.

(56) References Cited

U.S. PATENT DOCUMENTS

| | | | |
|---|---|---|---|
| 8,989,121 B2 | 3/2015 | Luo | |
| 9,264,208 B2 | 2/2016 | Chen et al. | |
| 9,445,413 B2 | 9/2016 | Seo et al. | |
| 2013/0121168 A1* | 5/2013 | Luo | H04W 72/042 370/242 |
| 2015/0055586 A1 | 2/2015 | Barbieri et al. | |
| 2015/0131560 A1* | 5/2015 | Von Elbwart | H04L 5/0042 370/329 |
| 2015/0264665 A1 | 9/2015 | Vos et al. | |

\* cited by examiner

*Primary Examiner* — Kent K Krueger
(74) *Attorney, Agent, or Firm* — Qualcomm IP Dept.; James Hunt Yancey, Jr.

(57) ABSTRACT

Coherence based pre-decoding pruning for control channels in wireless communication systems is discussed. Data is received on at least one channel resource of a plurality of channel resources. In addition, the determining of a plurality of channel coherence metrics is discussed, where a channel coherence metric for a channel resource indicates coherence information between channels on which the plurality of carriers associated with the channel resource operate. Additionally, the determining of one or more channel resources to search for data to be decoded based, at least in part, on the plurality of channel coherence metrics is also discussed. Other aspects, embodiments, and features are also claimed and described.

16 Claims, 6 Drawing Sheets

COHERENCE BASED PRE-DECODING PRUNING FOR CONTROL CHANNEL PROCESSING

CROSS-REFERENCE TO RELATED APPLICATIONS

This application claims the benefit of U.S. Provisional Patent Application No. 62/412,744, entitled "COHERENCE BASED PRE-DECODING PRUNING FOR CONTROL CHANNEL PROCESSING," filed on Oct. 25, 2016, which is expressly incorporated by reference herein in its entirety.

TECHNICAL FIELD

The technology discussed below relates generally to wireless communication systems and, more particularly, to coherence based pre-decoding pruning for control channels in wireless communication systems. Some embodiments enable and provide techniques for improved wireless communication receiver techniques for faster yet efficient operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a processor, data on at least one channel resource of a plurality of channel resources. Each channel resource may include a plurality of carriers. The method may also include determining, by the processor, a plurality of channel coherence metrics that each correspond to a different channel resource and indicates coherence information between channels on which the plurality of carriers associated with the channel resource operate. The method may further include determining, by the processor, one or more channel resources to search for data to be decoded based, at least in part, on the plurality of channel coherence metrics.

In an additional aspect of the disclosure, an apparatus configured for wireless communication includes a means for receiving, by a processor, data on at least one channel resource of a plurality of channel resources. Each channel resource may include a plurality of carriers. The apparatus may also include a means for determining, by the processor, a plurality of channel coherence metrics that each correspond to a different channel resource and indicates coherence information between channels on which the plurality of carriers associated with the channel resource operate. The apparatus may further include a means for determining, by the processor, one or more channel resources to search for data to be decoded based, at least in part, on the plurality of channel coherence metrics.

In an additional aspect of the disclosure, a computer program product has a computer-readable medium having program code recorded thereon. This program code includes code for causing a computer to receive data on at least one channel resource of a plurality of channel resources. Each channel resource may include a plurality of carriers. The program code may also include code for causing a computer to determine a plurality of channel coherence metrics that each correspond to a different channel resource and indicates coherence information between channels on which the plurality of carriers associated with the channel resource operate. The program code may also include code for causing a computer to determine one or more channel resources to search for data to be decoded based, at least in part, on the plurality of channel coherence metrics.

In an additional aspect of the disclosure, an apparatus includes at least one processor and a memory coupled to the processor. The processor is configured to receive data on at least one channel resource of a plurality of channel resources. Each channel resource may include a plurality of carriers. The processor may also be configured to determine a plurality of channel coherence metrics that each correspond to a different channel resource and indicates coherence information between channels on which the plurality of carriers associated with the channel resource operate. The processor may be further configured to determine one or more channel resources to search for data to be decoded based, at least in part, on the plurality of channel coherence metrics.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces. For example, next generation networks (e.g., 5G networks and beyond) are being designed to support features such as high bandwidth operations, as discussed in 3GPP Release 14/15 forward.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

Figure 1:
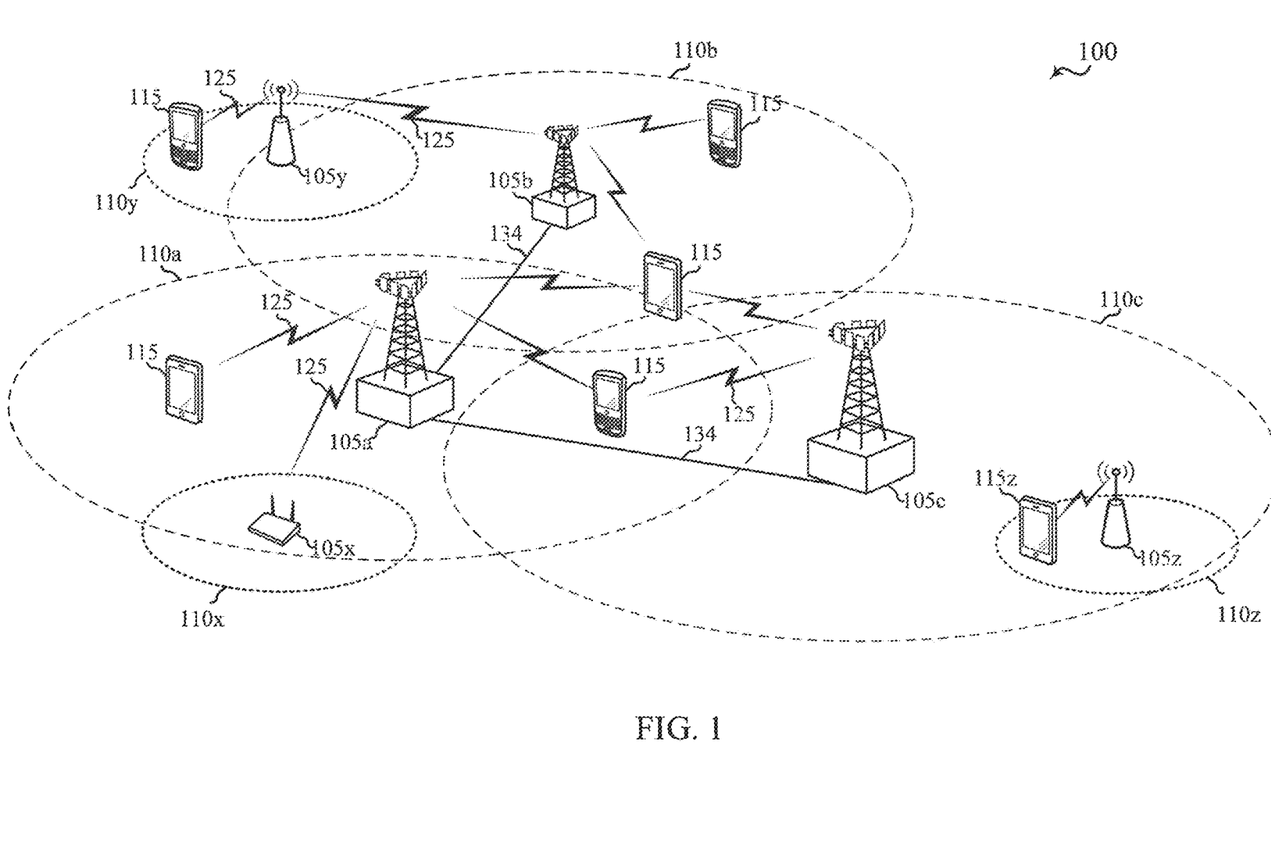
FIG. 1 is a diagram illustrating details of a wireless communication system according to some embodiments of the present disclosure.

FIG. 1 shows a wireless network 100 for communication according to some embodiments of the present disclosure. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements.

Turning back to FIG. 1 wireless network 100 includes a number of base stations, such as may comprise evolved node Bs (eNBs), referred to herein as eNBs 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used. In implementations of wireless network 100 herein, eNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, eNBs 105a, 105b and 105c are macro eNBs for the macro cells 110a, 110b and 110c, respectively. eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells. In next generation networks (e.g., 5G networks and beyond), gNBs may provide communication coverage, similar to the way an eNB may provide communication coverage.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Although backhaul communication 134 is illustrated as wired backhaul communications that may occur between eNBs, it should be appreciated that backhaul communications may additionally or alternatively be provided by wireless communications.

Figure 2:
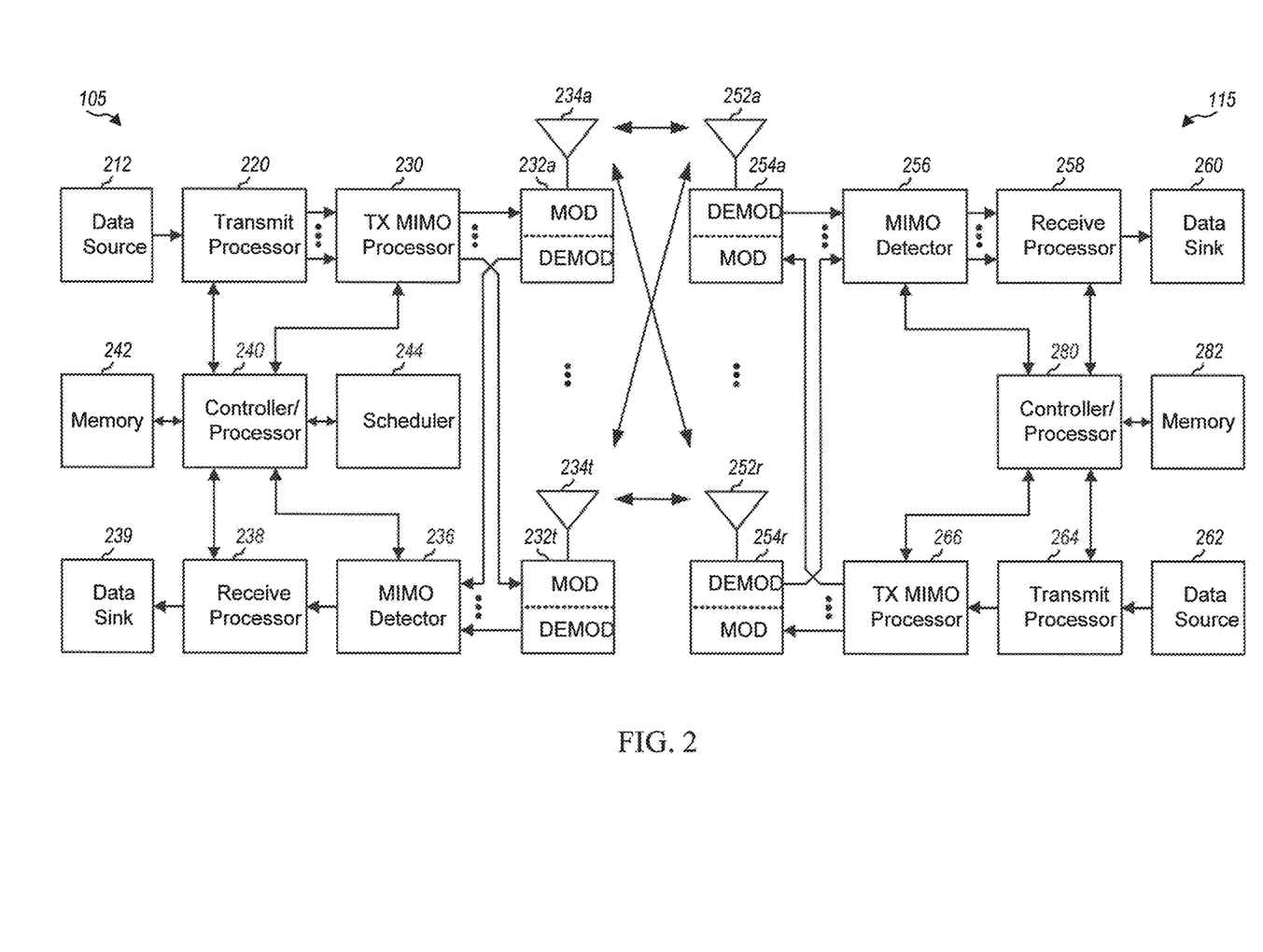
FIG. 2 is a diagram conceptually illustrating a design of a base station (e.g., eNB or gNB) and a UE configured according to some embodiments of the present disclosure.

FIG. 2 shows a block diagram of a design of base station 105 (e.g., eNB or gNB) and UE 115, which may be one of the base stations/eNBs and one of the UEs in FIG. 1. For a restricted association scenario, the eNB 105 may be small cell eNB 105z in FIG. 1, and UE 115 may be UE 115z, which in order to access small cell eNB 105z, would be included in a list of accessible UEs for small cell eNB 105z. eNB 105 may also be a base station of some other type. eNB 105 may be equipped with antennas 234a through 234t, and UE 115 may be equipped with antennas 252a through 252r.

At eNB 105, transmit processor 220 may receive data from data source 212 and control information from controller/processor 240. The control information may be for the PBCH, PCFICH, PHICH, PDCCH, etc. The data may be for the PDSCH, etc. Transmit processor 220 may process (e.g., encode and symbol map) the data and control information to obtain data symbols and control symbols, respectively.

Transmit processor 220 may also generate reference symbols, e.g., for the PSS, SSS, and cell-specific reference signal. Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from eNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to eNB 105. At eNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at eNB 105 and UE 115, respectively. Controller/processor 240 and/or other processors and modules at eNB 105 may perform or direct the execution of various processes for the techniques described herein. Controllers/processor 280 and/or other processors and modules at UE 115 may also perform or direct the execution of various processes for the techniques described herein. Memories 242 and 282 may store data and program codes for eNB 105 and UE 115, respectively. Scheduler 244 may schedule UEs for data transmission on the downlink and/or uplink.

Typically, when a UE, such as a mobile device, receives multiple messages on a control channel, such as multiple physical downlink control channel (PDCCH) messages, the UE must process and decode all the PDCCH messages regardless of whether any of the PDCCH messages contains information that is specifically intended for the UE because the UE does not know beforehand whether any of the PDCCH messages contains information that is specifically intended for the UE. Much of the time, none of the PDCCH messages contain information that is specifically intended for the UE, so after processing and decoding all of the PDCCH messages the UE goes back to sleep or enters an idle state. PDCCH processing and decoding is time and power consuming. Thus, much of the time, a UE is processing and decoding PDCCH messages even though there is no information intended for it.

Figure 3:
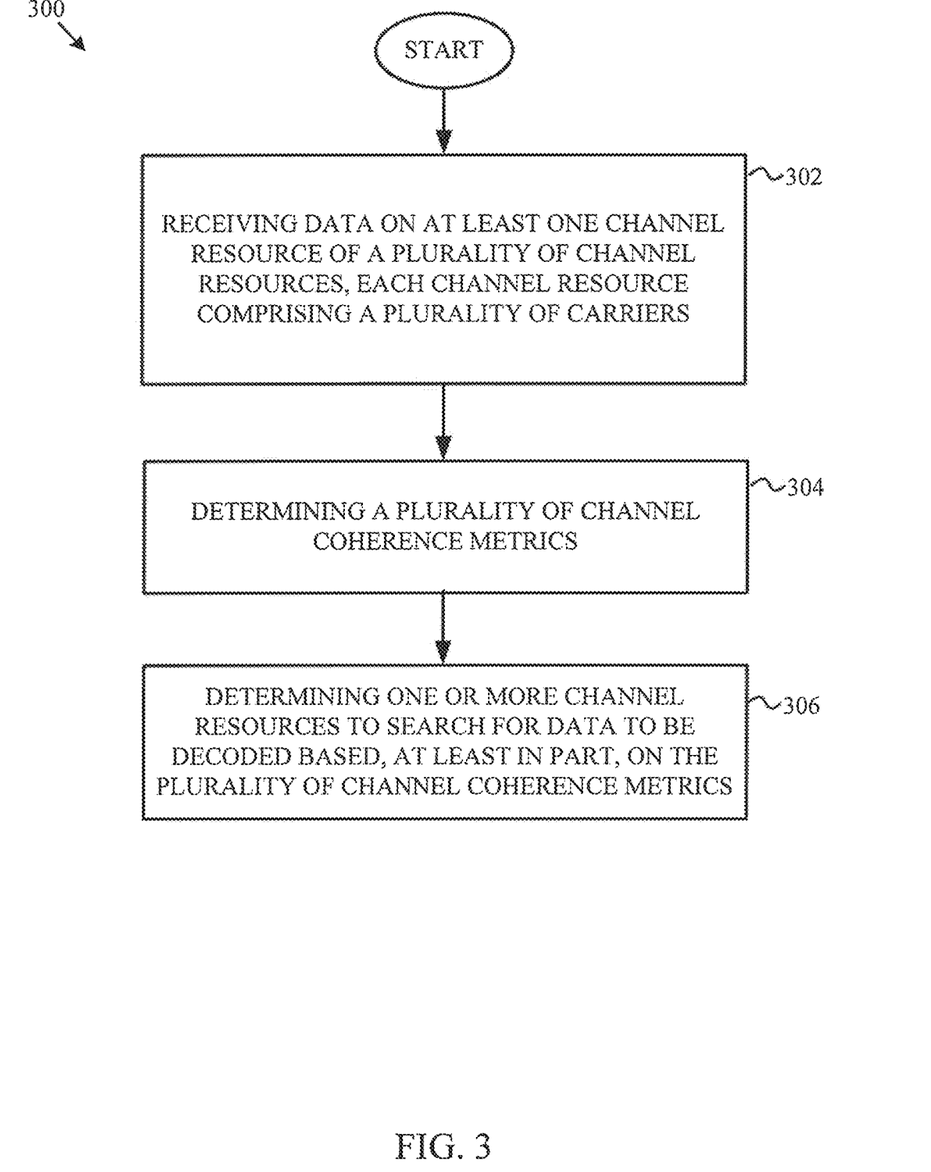
FIG. 3 is a block diagram illustrating a method for processing control channel messages according to some embodiments of the present disclosure.
Figure 6:
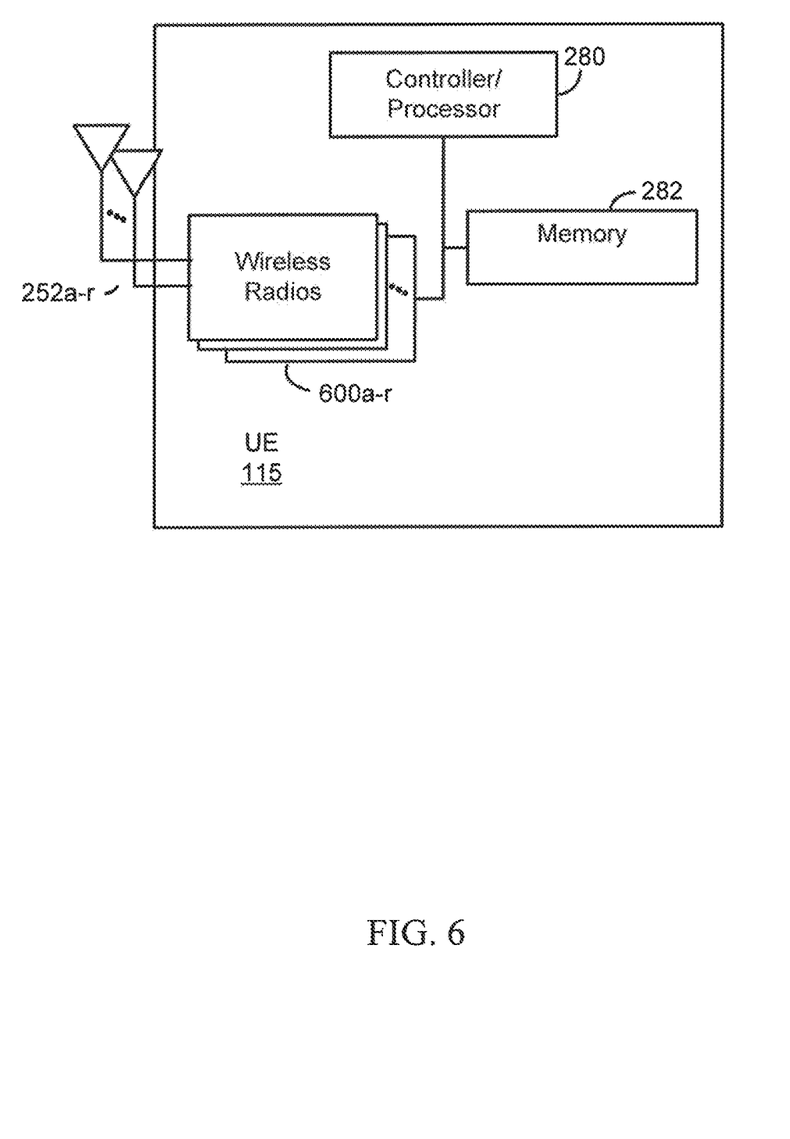
FIG. 6 is a block diagram illustrating a UE configured according to some embodiments of the present disclosure.

Aspects of the present disclosure improve UE power performance and reduce unnecessary processing by the UE of PDCCH messages by determining, before performing significant time and power consuming processing and decoding, whether there are PDCCH messages with data intended for the UE and/or determining the likely locations of the PDCCH messages with data intended for the UE so that the UE does not need to process and decode all possible locations. For example, FIG. 3 is a block diagram illustrating a method for processing control channel messages according to some embodiments of the present disclosure. Aspects of method 300 may be implemented with the aspects of this disclosure described with respect to FIGS. 1-2 and 4-6, such as a mobile device. The example blocks will also be described with respect to UE 115 as illustrated in FIG. 6. FIG. 6 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 600a-r and antennas 252a-r. Wireless radios 600a-r include various components and hardware, as illustrated in FIG. 2 for UE 115, including modulator/demodulators 254a-r, MIMO detector 256, receive processor 258, transmit processor 264, and TX MIMO processor 266.

Specifically, method 300 includes, at block 302, receiving, by a processor, data on at least one channel resource of a plurality of channel resources, each channel resource comprising a plurality of carriers. As a specific example, UE 115 may, under control of controller/processor 280, receive data on at least one channel resource of a plurality of channel resources. For example, a mobile device may receive data in at least one PDCCH message of a plurality of PDCCH messages.

Figure 4:
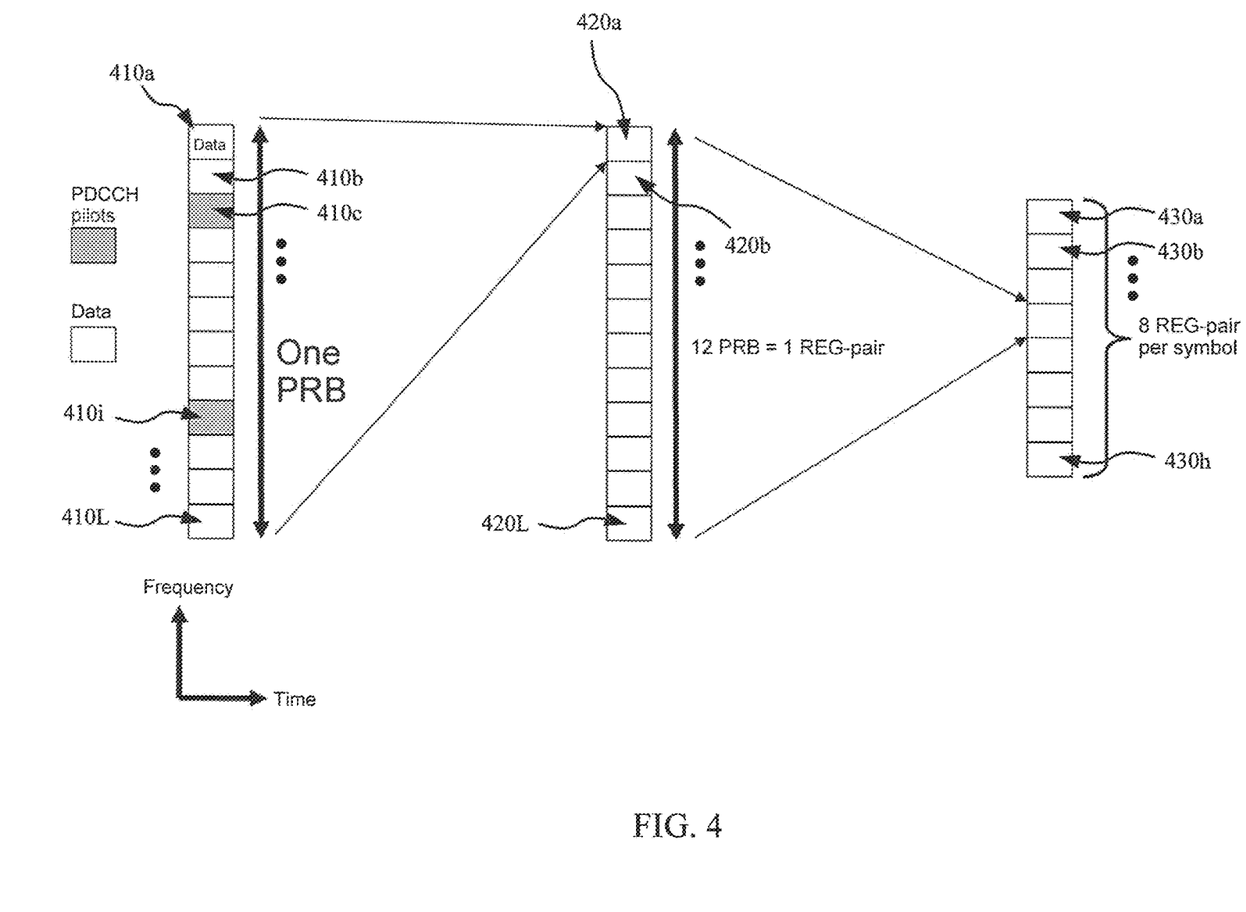
FIG. 4 shows a diagram that illustrates an example symbol structure of control channel messages received by mobile devices according to some embodiments of the present disclosure.

To illustrate an example structure of PDCCH messages, FIG. 4 shows a diagram that illustrates an example symbol structure of control channel messages received by mobile devices according to some embodiments of the present disclosure. A PDCCH message may be referred to as a resource element group-pair (REG-pair) 430a. FIG. 4 illustrates multiple REG-pairs 430a-h which may be received by a mobile device. Accordingly, in one aspect of the disclosure, the at least one channel resource of a plurality of channel resources on which data may be received by a mobile device, such as at block 302, may correspond to at least one of the REG-pairs 430 received by a mobile device.

In some embodiments, each REG-pair 430 may include multiple physical resource blocks (PRBs) 420a-L. A PRB 420 may be a grouping of one or more resource elements of a channel and/or antenna, wherein each resource element is capable of being allocated for transmission and reception over a particular channel. For example, as illustrated in FIG. 4, each PRB 420 may include multiple resource elements 410a-410L. Each resource element may correspond to a smallest unit of a channel frequency and time period combination of a channel that can be allocated for transmission and reception of information. For example, in the aspect of the present disclosure illustrated in FIG. 4, each resource element 410 may correspond to a single carrier signal associated with a frequency signal. Additionally, each resource element 410 may correspond to a symbol time period. Accordingly, each PDCCH message (or REG-pair 430) may include a plurality of carriers.

As illustrated in FIG. 4, in some aspects of the present disclosure, a PDCCH message (REG-pair) may include at least a pilot signal. In some aspects of the disclosure, such as the aspect illustrated in FIG. 4, the pilot signal may occupy two resource elements of a PRB 420. For example, in FIG. 4, the pilot signal occupies resource elements 410c and 410i. As illustrated in FIG. 4, the pilot signal may repeat every six resource elements in the frequency domain (or equivalently every half a PRB).

In some aspects of the present disclosure, a pilot signal may be a UE-specific reference signal. For example, a pilot signal may be a demodulation reference signal (DMRS) associated with a specific UE. In a certain aspect of the present disclosure, the pilot signal may be a Quadrature Phase Shift Keying (QPSK) symbol. In another aspect of the disclosure, a PDCCH message (REG-pair) may include multiple pilot signals. Some of the other pilot signals may be UE-specific reference signals and other pilot signals may not be UE-specific reference signals. Other pilot signals may be distributed across the resource elements the same as the pilot signals illustrated in FIG. 4 or differently. For example, in an aspect of the present disclosure in which other pilot signals are distributed in the same manner as the pilot signals illustrated in FIG. 4, the other pilot signals may occupy resource elements 410d and 410j. According to additional aspects of the present disclosure, although PDCCH messages include at least a UE-specific pilot signal, PDCCH messages also include other information, such as other pilot signals and information that informs the UE how to process and decode other data that the UE receives.

Returning to FIG. 3, at block 304, method 300 includes determining, by the processor, a plurality of channel coherence metrics. This may occur before channel estimations. A channel coherence metric of the plurality of channel coherence metrics can correspond to a different channel resource of the plurality of channel resources. A channel coherence metric for a channel resource indicates a level of coherence between channels on which the plurality of carriers associated with the channel resource operate. That is, coherence may determine how logically related a channel is to another channel. For example, UE 115 may, under control of controller/processor 280, determine a plurality of channel coherence metrics. In some aspects of the present disclosure, a channel coherence metric may be determined for each REG-pair (PDCCH message) 430 received by a UE, and each channel coherence metric may correspond to a different REG-pair (PDCCH message).

To determine a channel coherence metric, UEs can use a variety of modelling techniques. For example, a UE may model a signal it receives using the following equation:

$$y_i = h_i p_i + n_i, i = 0 \ldots N-1,$$

where $y_i$ is the signal received by the UE on a carrier associated with the resource element allocated to pilot signal $p_i$, $h_i$ is the model for the channel, $n_i$ is the model for noise on the channel. The subscript i may correspond to a distinct pilot signal transmission of the same kind of pilot in the REG-pair 430, where N may be the total number of resource elements allocated for the multiple transmissions of pilot signal p. Accordingly, the vector y may have a length that is equal to the number of pilot signals i transmitted in the REG-pair, with each $y_i$ corresponding to a different signal received by the UE on a different carrier associated with a different resource element allocated for transmission of pilot signal p. In some aspects of the disclosure, the physical channel may change smoothly between adjacent pilot signals. In another aspect of the disclosure, the quality of a measured physical channel may be reduced if wrong pilot sequences are used.

To obtain a measurement of the channel by removing the effect of the pilot signal on the channel, the UE may multiply each $y_i$ by the conjugate of the pilot signal associated with the respective $y_i$. For example, UE 115 may, under control of controller/processor 280, multiply each $y_i$ by the conjugate of the pilot signal associated with the respective $y_i$. The measured channel $z_i$ for pilot signal $p_i$ may be represented as:

$$z_i = y_i p_i^* = h_i p_i p_i^* + n_i p_i^* = h_i + n_i p_i^*.$$

As evident from the equation for $z_i$, the resulting $z_i$ is the measured channel for the carrier associated with a resource element allocated to $p_i$ plus some noise.

With the measured channel $z_i$ for each carrier associated with resource elements allocated for transmission of pilot signal $p_i$ available in the vector z, the UE may determine a coherence among the channels by computing a Symbol Timing Offset (STO) inner product for adjacent channel measurements. As one specific example, UE 115 may, under control of controller/processor 280, determine a coherence among the channels by computing a Symbol Timing Offset (STO) inner product for adjacent channel measurements. For example, computation of the STO inner product may be represented as:

$$K_i = z_i z_{i-1}^* = (h_i + n_i)(h_{i-1} + n_{i-1})^*, i = 1 \ldots N-1.$$

As shown, the STO inner product may be computed by multiplying the channel $z_i$ by the conjugate of the previous channel $z_i$, where $z_i$ corresponds to a first measured channel for a first carrier associated with a resource element allocated to $p_i$ and $z_{i-1}$ corresponds to the previous measured channel for another carrier associated with a resource element allocated to $p_i$. The result $K_i$ may be a coherence metric that provides an indication of the coherence between the two measured channels $z_i$ and $z_{i-1}$ used to obtain $K_i$.

To determine a channel coherence metric for a REG-pair that indicates a level of coherence between channels on which the plurality of carriers associated with the REG-pair operate, the UE may accumulate the coherence metrics Ki. For example, UE 115 may, under control of controller/processor 280, accumulate the coherence metrics Ki. In mathematical terms, the channel coherence metric for the REG-pair may be represented as:

$$C_{test} = \left| \sum_i K_i \right|.$$

$C_{test}$ may be the channel coherence metric for a REG-pair that indicates a level of coherence between channels on which the plurality of carriers associated with the REG-pair operate. If noise is neglected, $C_{test}$ for a coherent channel may be approximately equal to $(N-1)|h|$, and $C_{test}$ for an incoherent channel may be approximately equal to $\sqrt{(N-1)} |h|$.

As explained above, a channel coherence metric may be determined for each REG-pair 430. Accordingly, for each REG-pair 430 as illustrated in FIG. 4, a different $C_{test}$ may be computed as discussed above, with each $C_{test}$ associated with a REG-pair 430 indicating a level of coherence between the channels within the REG-pair 430 used to transmit the pilot signals within a REG-pair 430. The multiple $C_{test}$ may be the plurality of channel coherence metrics determined by a UE, such as at block 304. As explained above, the plurality of channel coherence metrics may be determined based, at least in part, on a pilot signal.

In some aspects of the present disclosure, when multiple pilots that are not of the same kind are allocated to resource elements within a REG-pair 430, a different coherence metric may be obtained for each different pilot signal. For example, if a REG-pair 430 includes two pilot signals that are transmitted in various resource elements of the REG-pair 430, two channel coherence metrics $C_{test}$'s may be determined for the REG-pair 430. Thus, in some aspects of the present disclosure, for each different kind of pilot signal allocated to resource elements within a REG-pair 430, a different channel coherence metric $C_{test}$ may be determined. In the aspect of the disclosure illustrated in FIG. 4, repetition of only a single pilot signal within a REG-pair 430 is illustrated, thus leading to the calculation of only a single channel coherence metric for each REG-pair 430, but in other aspects of the present disclosure, multiple pilot signals may be repeated within a REG-pair 430, leading to the calculation of multiple channel coherence metrics for the REG-pair 430, with each channel coherence metric being associated with a different pilot signal within REG-pair 430. In some aspects of the present disclosure, when multiple channel coherence metrics are determined for each REG-pair 430, the multiple different channel coherence metrics may be evaluated distinctly or together to provide an overall indication for the REG-pair 430 of the level of coherence between channels on which the plurality of carriers associated with the REG-pair 430 operate.

At block 306, method 300 includes determining, by the processor, one or more channel resources to search for data to be decoded based, at least in part, on the plurality of channel coherence metrics. In particular, UE 115 may, under control of controller/processor 280, determine one or more channel resources to search for data to be decoded based, at least in part, on the plurality of channel coherence metrics. For example, a UE may determine which of the one or more REG-pairs 430 are likely to include a PDCCH message that is intended for the UE, and subsequently process and decode only those REG-pairs 430 which are determined to likely include a PDCCH message intended for the UE while not processing or decoding the other REG-pairs 430. In other words, the UE may prune out, i.e., reject, from further processing and decoding the REG-pairs 430 that are determined to not likely include a PDCCH message that is intended for the UE. In some aspects of the present disclosure, the determination of which of the one or more REG-pairs 430 are likely to include a PDCCH message intended for the UE may be based on channel coherence metrics $C_{test}$ that were calculated for each REG-pair 430.

In some aspects of the disclosure, a base station may transmit one or more PDCCH messages intended for a UE receiving the REG-pairs 430 in one or more of the REG-pairs 430. According to an aspect of the present disclosure, the base station may determine where to place the PDCCH messages with information intended for a UE based on a transmission option used for transmitting information to a UE. Multiple transmission options may be available to a base station.

Figure 5:
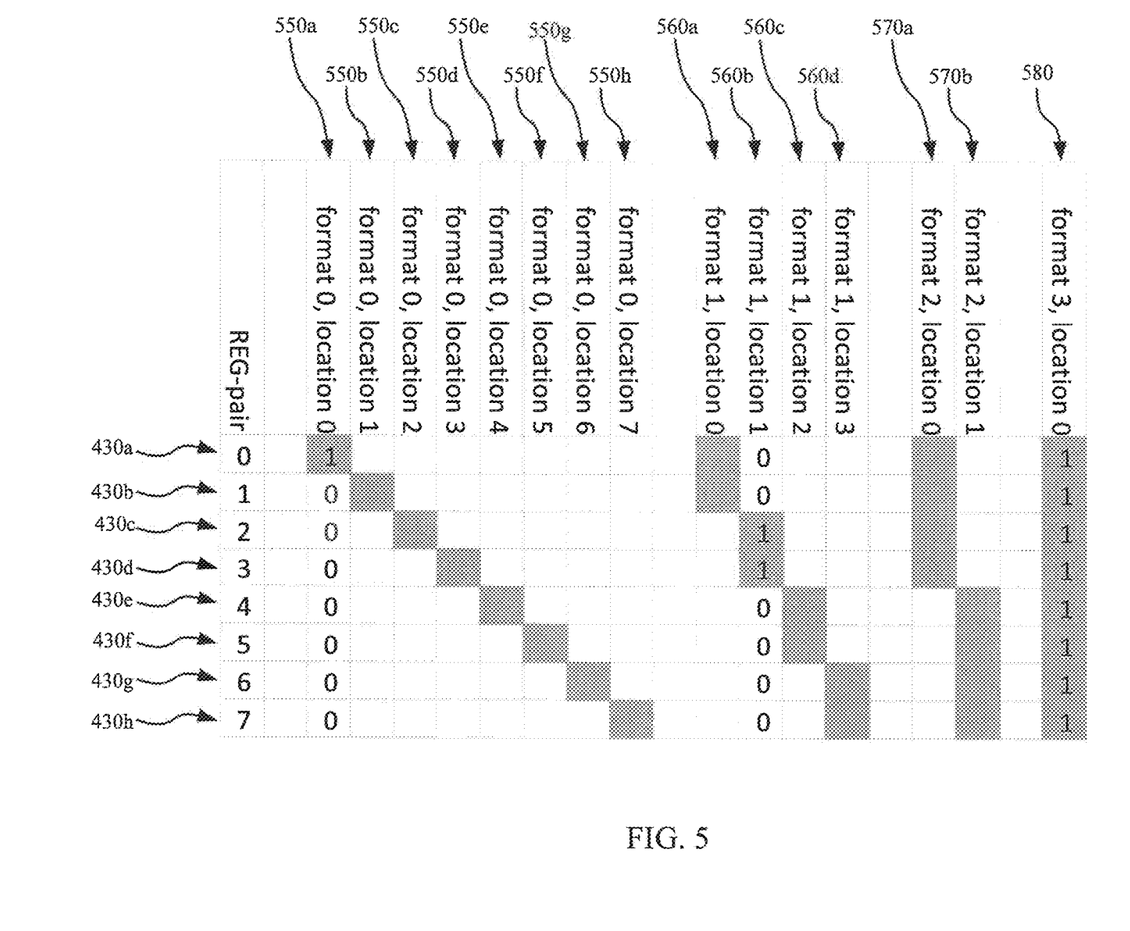
FIG. 5 shows a diagram that illustrates the location(s) of control channel messages with UE-specific information when the control channel messages are transmitted in accordance to various transmission options according to some embodiments of the present disclosure.

For example, FIG. 5 shows a diagram that illustrates the location(s) of control channel messages with UE-specific information when the control channel messages are transmitted in accordance to various transmission options according to some embodiments of the present disclosure. In the aspect of the present disclosure illustrated in FIG. 5, the base station may have fifteen transmission options 550*a-h*, 560*a-d*, 570*a-b*, and 580. Each transmission mode may also be referred to as a candidate. Thus, in FIG. 5, there are fifteen candidates (550*a-h*, 560*a-d*, 570*a-b*, and 580) which the base station may use for transmitting data to a UE. As illustrated in FIG. 5, where the base station places the PDCCH data intended for a UE may depend on the candidate used for transmitting information. In FIG. 5, the location(s) of the PDCCH message(s) with data intended for the UE is identified by a shaded REG-pair. For example, when the base station transmits according to candidate 550*a*, the base station may place the PDCCH message that contains data intended for the UE in REG-pair 430*a*. Similarly, when the base station transmits according to candidate 560*c*, the base station may place the PDCCH messages that contain data intended for the UE in REG-pairs 430*e* and 430*f*. Similarly, when the base station transmits according to candidate 570*a*, the base station may place the PDCCH messages that contain data intended for the UE in REG-pairs 430*a-d*. When the base station transmits according to candidate 580, the base station may place the PDCCH messages that contain data intended for the UE in all REG-pairs 430*a-h*. Accordingly, each candidate of the plurality of candidates specifies a different combination of one or more channel resources that include the data to be decoded.

The UE does not typically know before receiving the REG-pairs which candidates contain PDCCH data intended for the UE. To avoid processing and decoding all the candidates, the UE may determine, for example under control of controller/processor 280, one or more REG-pairs 430 that are likely to include a PDCCH message that is intended for the UE, and subsequently process and decode only those REG-pairs 430 which are determined to likely include a PDCCH message intended for the UE while not processing or decoding the other REG-pairs 430. In other words, the UE may prune out, i.e., reject, from further processing and decoding the REG-pairs 430 that are determined to not likely include a PDCCH message that is intended for the UE.

To determine the one or more channel resources to search for data to be decoded based, at least in part, on the plurality of channel coherence metrics, the UE may determine a plurality of candidate coherence metrics for a plurality of candidates based, at least in part, on the plurality of channel coherence metrics. In particular, UE 115 may, under control of controller/processor 280, determine a plurality of candidate coherence metrics for a plurality of candidates based, at least in part, on the plurality of channel coherence metrics. To aid in determining the plurality of candidate coherence metrics, the UE may represent each candidate as a vector having a length equal to the number of REG-pairs. For example, in FIG. 5 there are eight REG-pairs on which a base station may place a PDCCH message with data intended for the UE, so each candidate vector may be represented as a vector of length eight with each of the eight values of the vector being binary values (1's and 0's) and where a 1 is used to indicate the location of the REG-pair used to transmit a PDCCH message with data intended for the UE. For example, in FIG. 5, candidate 550*a* may be represented by the vector {1, 0, 0, 0, 0, 0, 0, 0}, candidate 560*b* may be represented by the vector {0, 0, 1, 1, 0, 0, 0, 0}, and candidate 580 may be represented by the vector {1, 1, 1, 1, 1, 1, 1, 1}.

To determine a plurality of candidate coherence metrics for a plurality of candidates based, at least in part, on the plurality of channel coherence metrics the UE may, for example under control of controller/processor 280, compute, for each candidate, an inner product between the candidate pattern and a vector that is a function of the channel coherence metrics. In some aspects of the disclosure, such an inner product may be mathematically represented as:

$$C^{candidate} = \sum_i P_i^{candidate} f_i(\{C_{test,0,N}\}),$$

where $C^{(candidate)}$ is the candidate coherence metric for a candidate and $P_i^{(candidate)}$ is the candidate vector for the candidate whose candidate coherence metric is being evaluated.

In one example aspect of the disclosure, the inner product may be mathematically represented as:

$$C^{(candidate)} = \sum_{i=0}^{7} \left( C_{test,i} - \alpha \sqrt{\max_i \{C_{test,i}\}} \right) P_i^{(candidate)},$$

where the candidate coherence metric for a candidate is $C^{(candidate)}$. As shown in this first example aspect, the candidate coherence metric for a candidate may be a product of two values: the first value is a summation of the difference between a channel coherence metric for each REG-pair 430 and a scaled square root of the maximum channel coherence metric from the plurality of channel coherence metrics associated with the REG-pairs 430; and the second value $P_i^{(candidate)}$ is the candidate vector, such as the vector {1, 0, 0, 0, 0, 0, 0, 0} for candidate 550a, for the candidate whose candidate coherence metric is being evaluated. In other words, to compute the first value in the example aspect, the UE may, for example under control of controller/processor 280, calculate, for each REG-pair, the difference between the channel coherence metric for the REG-pair and a scaled square root of the maximum channel coherence metric from the plurality of channel coherence metrics associated with the REG-pairs 430, and then sum all of the differences. The scaling constant α may be used to unbias the channel coherence metrics and may be determined based on other parameters associated with the channel, such as long term averages of the channel. In an aspect of the present disclosure, each candidate may have a different bias. In some aspects of the present disclosure, the maximum channel coherence metric from the plurality of channel coherence metrics associated with the REG-pairs 430 may be used for unbiasing because the maximum channel coherence metric from the plurality of channel coherence metrics associated with the REG-pairs 430 may be more likely to correspond to a REG-pair on which data intended for the UE actually exists than another channel coherence metric.

In another example aspect of the disclosure, the vector that is a function of the channel coherence metrics need not include a square root of the maximum channel coherence metric from the plurality of channel coherence metrics associated with the REG-pairs 430. In particular, in another example aspect of the disclosure, the inner product may be mathematically represented as:

$$C^{candidate} = \sum_i P_i^{candidate} (C_{test,i} - \alpha \times \max\{C_{tests,i}\}).$$

This second example aspect of the inner product may be similar to the first example aspect of the inner product with the exception that the vector that is a function of the channel coherence metrics may instead be a summation of the difference between a channel coherence metric for each REG-pair 430 and a scaled maximum channel coherence metric from the plurality of channel coherence metrics associated with the REG-pairs 430. One of skill in the art would readily recognize that the vector that is a function of the channel coherence metrics may be specifically implemented in various other ways without departing from the scope and spirit of this disclosure so long as the vector is a function of the channel coherence metrics. For example, the vector may be modified to optimize other wireless communication parameters or may be modified based on the channels or standards used for communication.

In yet another aspect of the present disclosure, rather than subtracting a scaled square root of the maximum channel coherence metric of the plurality of channel coherence metrics associated with the REG-pairs 430 from the channel coherence metric for each REG-pair 430 in the summation used to determine $C^{(candidate)}$, the summation may be determined by subtracting other values from the channel coherence metric for each REG-pair 430. For example, in one aspect of the present disclosure, the value subtracted from the channel coherence metric for each REG-pair 430 may be α*max{Ctest,i}/sqrt(N−1). In other aspects of the present disclosure, the value subtracted from the channel coherence metric for each REG-pair 430 within the summation may be a biasing term that depends on the maximum value of the plurality of channel coherence metrics associated with the REG-pairs 430 and that may need to be removed to unbias the channel coherence metrics.

According to some aspects of the present disclosure, the candidate coherence metric $C^{(candidate)}$ for a candidate may provide an indication of the likelihood that the data to be decoded is in the combination of channel resources specified by the candidate. That is, the candidate coherence metric $C^{(candidate)}$ for a candidate may provide an indication of the likelihood that a PDCCH message with data intended for the UE that received the REG-pairs is in the combination of REG-pairs specified by the candidate. For example, a candidate coherence metric for candidate 560b may provide an indication of the likelihood that PDCCH messages with data intended for the UE are in REG-pairs 430c and 430d. As a specific example, and not limitation, a first candidate coherence metric associated with a first candidate that has a magnitude higher than a second candidate coherence metric associated with a second candidate may indicate that a PDCCH message with data intended for the UE is more likely to be in the combination of REG-pairs specified by the first candidate than the combination of REG-pairs specified by the second candidate.

After determining a plurality of candidate coherence metrics for a plurality of candidates based, at least in part, on the plurality of channel coherence metrics, the UE may, for example under control of controller/processor 280, determine the one or more channel resources to search for data to be decoded based, at least in part, on the plurality of candidate coherence metrics. For example, with reference to FIGS. 4-5, the UE may determine the one or more REG-pairs to search for PDCCH messages that include data intended for the UE based on the plurality of candidate coherence metrics. For example, in some aspects of the present disclosure the plurality of candidate coherence metrics may be sorted, for example by UE 115 under control of controller/processor 280, by magnitude and based, at least in part, on the sorting the UE may determine the one or more REG-pairs to search for PDCCH messages that include data intended for the UE. Thus, in the aspect of the present disclosure illustrated in FIG. 5, the UE may, for example under control of controller/processor 280, sort the fifteen candidate coherence metrics for candidates 550a-h, 560a-d, 570a-b, and 580, and then determine the one or more REG-pairs to search for PDCCH messages that include data intended for the UE based on analysis of the sorted fifteen candidate coherence metrics.

According to one aspect of the disclosure the UE may, for example under control of controller/processor 280, determine that a certain number of candidates having the highest candidate coherence metrics are most likely to correctly identify the REG-pairs that include PDCCH messages with data intended for the UE. Based on that determination, the UE may, for example under control of controller/processor 280, process and decode only the REG-pairs that each of the selected candidates indicate might have a PDCCH message with data intended for the UE. In other words, the UE may prune out, i.e., reject, from further processing and decoding the REG-pairs that are not indicated by the selected candidates to likely include a PDCCH message with data intended for the UE. As a specific example, and not limitation, after determining the candidate coherence metrics and sorting them based on magnitude, the UE may, for example under control of controller/processor 280, select for further processing the candidate associated with the highest candidate coherence metric, for example, candidate 560c, and then process and decode only the REG-pairs 430e and 430f, where REG-pairs 430e and 430f are the REG-pairs that candidate 560c indicates will include PDCCH messages with data intended for the UE. A candidate coherence metric may be considered the highest when its value is higher in magnitude than the value of the other candidate coherence metrics that were sorted based on magnitude. As another specific example, and not limitation, after determining the candidate coherence metrics and sorting them based on magnitude, the UE may, for example under control of controller/processor 280, select for further processing the three candidates associated with the highest three candidate coherence metrics, for example, candidates 550a-c, and then process and decode only the REG-pairs 430a, 430b, and 430c, where REG-pairs 430a, 430b, and 430c are the REG-pairs that candidates 550a-c indicate will include PDCCH messages with data intended for the UE.

In some aspects of the present disclosure, a UE may, for example under control of controller/processor 280, receive information about the channels on which the plurality of carriers associated with the plurality of channel resources operate and then determine, for example under control of controller/processor 280, a threshold channel coherence value for the plurality of channel coherence metrics based, at least in part, on the received information about the channels on which the plurality of carriers associated with the plurality of channel resources operate. Threshold values can have a variety of characteristics. For example, a UE may, for example under control of controller/processor 280, receive information about the channels on which the plurality of carriers associated with the plurality of REG-pairs operate. According to one aspect of the disclosure, the UE may, for example under control of controller/processor 280, receive information that indicates what kind of channel measurements the UE should expect. For example, a UE may, for example under control of controller/processor 280, receive statistics for a channel or may obtain information regarding a previous successful decoding of a candidate or an expected value of the coherency of the channel or candidate. Based on the received channel information, the UE may, for example under control of controller/processor 280, set a threshold channel coherence value for the plurality of channel coherence metrics (the $C_{test}$'s for each REG-pair 430). According to another aspect of the present disclosure, the UE may, for example under control of controller/processor 280, determine a threshold channel coherence value for the plurality of channel coherence metrics without receiving the additional information. In other words, the UE may also set, for example under control of controller/processor 280, a threshold channel coherence value for the plurality of channel coherence metrics (the $C_{test}$'s for each REG-pair 430) without receiving the addition information. In one aspect, the UE may, for example under control of controller/processor 280, determine the threshold channel coherence value for the plurality of channel coherence metrics based on analysis of the signals the UE received. For example, the UE may, for example under control of controller/processor 280, analyze the received signal, determine a noise level in the signal, and determine the threshold channel coherence value for the plurality of channel coherence metrics based on the determined noise level in the signals the UE received.

After the UE has determined a threshold channel coherence value for the plurality of channel coherence metrics, the UE may, for example under control of controller/processor 280, compare the plurality of channel coherence metrics to the threshold channel coherence value. When the plurality of channel coherence metrics (the $C_{test}$'s for each REG-pair 430) are below a threshold channel coherence value, the UE may determine that none of the one or more channel resources include data to be decoded. For example, the UE may determine that none of the REG-pairs 430 will include a PDCCH message with data intended for the UE or that none of the REG-pairs 430 are likely to include a PDCCH message with data intended for the UE. In one aspect of the present disclosure, the UE may, for example under control of controller/processor 280, return to a sleep or idle mode when it has determined that the plurality of channel coherence metrics are below the threshold channel coherence value, and that therefore none of the one or more channel resources include PDCCH data intended for the UE that should be decoded. In other aspects of the disclosure, when one or more of the plurality of channel coherence metrics (the $C_{test}$'s for each REG-pair 430) are equal to or above the threshold channel coherence value, the UE may determine that the one or more channel resources associated with the one or more of the plurality of channel coherence metrics that are equal to or above the threshold channel coherence value are most likely to include data to be decoded by the UE. For example, the UE may determine that the one or more REG-pairs 430 associated with the one or more of the plurality of channel coherence metrics that are equal to or above the threshold channel coherence value are most likely to include a PDCCH message with data intended for the UE and that therefore should be decoded by the UE.

According to some aspects of the disclosure, the UE may determine a threshold channel coherence value by performing simulations of communication on a channel. For example, the UE may obtain a typical channel coherency value, which may be used as the threshold channel coherence value, based on simulations of a frequency selective channel. In addition, the UE may also normalize the plurality of channel coherence metrics by their energies. The energy-normalized channel coherence metrics may then be compared to the determined typical channel coherency value to determine whether one or more channel resources include data to be decoded, or whether none of the one or more channel resources include data to be decoded, based on whether the energy-normalized channel coherence metrics are above or below the typical channel coherency value or within a range of the typical channel coherency value. In another aspect of the disclosure, a threshold channel coherence value may be determined based on logged values of previously failed and/or successful decodings of channel resources and the associated logged channel coherence values.

Similarly, in some aspects of the present disclosure, a UE may, for example under control of controller/processor 280, receive information about the channels on which the plurality of carriers associated with the plurality of channel resources operate and then determine a threshold candidate coherence value for the plurality of candidate coherence metrics based, at least in part, on the received information about the channels on which the plurality of carriers associated with the plurality of channel resources operate. For example, a UE may receive information about the channels on which the plurality of carriers associated with the plurality of REG-pairs operate. According to one aspect of the disclosure, the UE may, for example under control of controller/processor 280, receive information that indicates what kind of channel measurements the UE should expect. For example, a UE may receive statistics for a channel or may obtain information regarding a previous successful decoding of a candidate or an expected value of the coherency of the channel or candidate. Based on the received channel information, the UE may, for example under control of controller/processor 280, set a threshold candidate coherence value for the plurality of candidate coherence metrics (the $C^{(candidate)}$'s for each candidate).

According to another aspect of the present disclosure, the UE may, for example under control of controller/processor 280, determine a threshold candidate coherence value for the plurality of candidate coherence metrics without receiving the additional information. In other words, the UE may, for example under control of controller/processor 280, also set a threshold candidate coherence value for the plurality of candidate coherence metrics (the $C^{(candidate)}$'s for each candidate) without receiving the addition information. In one aspect, the UE may, for example under control of controller/processor 280, determine the threshold candidate coherence value for the plurality of candidate coherence metrics based on analysis of the signals the UE received. For example, the UE may, for example under control of controller/processor 280, analyze the received signal, determine a noise level in the signal, and determine the threshold candidate coherence value for the plurality of candidate coherence metrics based on the determined noise level in the signals the UE received.

After the UE has determined a threshold candidate coherence value for the plurality of candidate coherence metrics, the UE may, for example under control of controller/processor 280, compare the plurality of candidate coherence metrics to the threshold candidate coherence value. When the plurality of candidate coherence metrics (the $C^{(candidate)}$'s for each candidate) are below a threshold candidate coherence value, the UE may determine that none of the one or more channel resources include data to be decoded. For example, the UE may determine, for example under control of controller/processor 280, that none of the REG-pairs 430 will include a PDCCH message with data intended for the UE or that none of the REG-pairs 430 are likely to include a PDCCH message with data intended for the UE. In one aspect of the present disclosure, the UE may, for example under control of controller/processor 280, return to a sleep or idle mode when it has determined that the plurality of candidate coherence metrics are below the threshold candidate coherence value, and that therefore none of the one or more channel resources include PDCCH data intended for the UE that should be decoded. In other aspects of the disclosure, when one or more of the plurality of candidate coherence metrics (the $C^{(candidate)}$'s for each candidate) are equal to or above the threshold candidate coherence value, the UE may determine that the one or more channel resources associated with the one or more of the plurality of candidate coherence metrics that are equal to or above the threshold candidate coherence value are most likely to include data to be decoded by the UE. For example, the UE may determine that the one or more REG-pairs 430 associated with the one or more of the plurality of candidate coherence metrics that are equal to or above the threshold candidate coherence value are most likely to include a PDCCH message with data intended for the UE and that therefore should be decoded by the UE.

A UE implementing aspects of the present disclosure may conserve power by determining soon after receiving a PDCCH message whether there is data in the PDCCH message that is intended for the UE and that therefore needs to be processed and decoded. Similarly, the UE may prune out, i.e., reject, from further processing and decoding PDCCH messages that are not intended for the UE. By making the determination before fully processing and decoding all the candidates, the UE may determine soon after waking up that it can go back to a sleep or idle state because the received PDCCH message does not include data that is intended for the UE.

Those of skill in the art would understand that although PDCCH messages are disclosed throughout the present disclosure, aspects of the present disclosure are not limited to application to only PDCCH messages. For example, aspects of the present disclosure may also be applied to any other channel that might or might not be allocated to a particular UE, and bearing a UE-specific pilot (e.g., a paging channel). In particular, in addition to conserving power and reducing unnecessary processing and decoding of PDCCH messages, aspects of this disclosure may be implemented to conserve power and reduce unnecessary processing and decoding of messages other than PDCCH messages, such as paging channel messages.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in the figures may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a processor, data on at least one channel resource of a plurality of channel resources, each channel resource comprising a plurality of carrier channels;
   determining, by the processor, a plurality of channel coherence metrics, wherein each channel coherence metric of the plurality of channel coherence metrics corresponds to a different channel resource of the plurality of channel resources and indicates coherence information between at least two carrier channels of the plurality of carrier channels associated with a single channel resource of the plurality of channel resources; and
   determining, by the processor, one or more channel resources to search for data to be decoded based, at least in part, on the plurality of channel coherence metrics.

2. The method of claim 1, further comprising:
   determining a plurality of candidate coherence metrics for a plurality of candidates based, at least in part, on the plurality of channel coherence metrics, wherein each candidate of the plurality of candidates specifies a different combination of one or more channel resources that include the data to be decoded, and wherein the candidate coherence metric for a candidate indicates a likelihood that the data to be decoded is in the combination of channel resources specified by the candidate; and determining the one or more channel resources to search for data to be decoded based, at least in part, on the plurality of candidate coherence metrics.

3. The method of claim 2, further comprising:
sorting the plurality of candidate coherence metrics; and
determining the one or more channel resources to search for data to be decoded based, at least in part, on the sorted plurality of candidate coherence metrics.

4. The method of claim 2, further comprising:
receiving information about the plurality of carrier channels associated with the plurality of channel resources;
determining a threshold candidate coherence value for the plurality of candidate coherence metrics based, at least in part, on the received information about the plurality of carrier channels associated with the plurality of channel resources;
comparing the plurality of candidate coherence metrics to the threshold candidate coherence value; and
determining that none of the one or more channel resources include data to be decoded when the plurality of candidate coherence metrics are below the threshold candidate coherence value.

5. The method of claim 2, further comprising:
determining a threshold candidate coherence value for the plurality of candidate coherence metrics;
comparing the plurality of candidate coherence metrics to the threshold candidate coherence value; and
determining that none of the one or more channel resources include data to be decoded when the plurality of candidate coherence metrics are below the threshold candidate coherence value.

6. The method of claim 1, further comprising:
receiving information about the plurality of carrier channels associated with the plurality of channel resources;
determining a threshold channel coherence value for the plurality of channel coherence metrics based, at least in part, on the received information about the plurality of carrier channels associated with the plurality of channel resources;
comparing the plurality of channel coherence metrics to the threshold channel coherence value; and
determining that none of the one or more channel resources include data to be decoded when the plurality of channel coherence metrics are below the threshold channel coherence value.

7. The method of claim 1, further comprising:
determining a threshold channel coherence value for the plurality of channel coherence metrics;
comparing the plurality of channel coherence metrics to the threshold channel coherence value; and
determining that none of the one or more channel resources include data to be decoded when the plurality of channel coherence metrics are below the threshold channel coherence value.

8. The method of claim 1, wherein the received data comprises at least a pilot signal, and wherein the plurality of channel coherence metrics are determined based, at least in part, on the pilot signal.

9. An apparatus configured for wireless communication, the apparatus comprising:
at least one processor; and
a memory coupled to the at least one processor, wherein the at least one processor is configured:
to receive data on at least one channel resource of a plurality of channel resources, each channel resource comprising a plurality of carrier channels;
to determine a plurality of channel coherence metrics, wherein each channel coherence metric of the plurality of channel coherence metrics corresponds to a different channel resource of the plurality of channel resources and indicates coherence information between at least two carrier channels of the plurality of carrier channels associated with a single channel resource of the plurality of channel resources; and
to determine one or more channel resources to search for data to be decoded based, at least in part, on the plurality of channel coherence metrics.

10. The apparatus of claim 9, wherein the processor is further configured to:
determine a plurality of candidate coherence metrics for a plurality of candidates based, at least in part, on the plurality of channel coherence metrics, wherein each candidate of the plurality of candidates specifies a different combination of one or more channel resources that include the data to be decoded, and wherein the candidate coherence metric for a candidate indicates a likelihood that the data to be decoded is in the combination of channel resources specified by the candidate; and
determine the one or more channel resources to search for data to be decoded based, at least in part, on the plurality of candidate coherence metrics.

11. The apparatus of claim 10, wherein the processor is further configured to:
sort the plurality of candidate coherence metrics; and
determine the one or more channel resources to search for data to be decoded based, at least in part, on the sorted plurality of candidate coherence metrics.

12. The apparatus of claim 10, wherein the processor is further configured to:
receive information about the plurality of carrier channels associated with the plurality of channel resources;
determine a threshold candidate coherence value for the plurality of candidate coherence metrics based, at least in part, on the received information about the plurality of carrier channels associated with the plurality of channel resources;
compare the plurality of candidate coherence metrics to the threshold candidate coherence value; and
determine that none of the one or more channel resources include data to be decoded when the plurality of candidate coherence metrics are below the threshold candidate coherence value.

13. The apparatus of claim 10, wherein the processor is further configured to:
determine a threshold candidate coherence value for the plurality of candidate coherence metrics;
compare the plurality of candidate coherence metrics to the threshold candidate coherence value; and
determine that none of the one or more channel resources include data to be decoded when the plurality of candidate coherence metrics are below the threshold candidate coherence value.

14. The apparatus of claim 9, wherein the processor is further configured to:
receive information about the plurality of carrier channels associated with the plurality of channel resources;
determine a threshold channel coherence value for the plurality of channel coherence metrics based, at least in part, on the received information about the plurality of carrier channels associated with the plurality of channel resources;

compare the plurality of channel coherence metrics to the threshold channel coherence value; and determine that none of the one or more channel resources include data to be decoded when the plurality of channel coherence metrics are below the threshold channel coherence value.

15. The apparatus of claim 9, wherein the processor is further configured to:

determine a threshold channel coherence value for the plurality of channel coherence metrics;

compare the plurality of channel coherence metrics to the threshold channel coherence value; and determine that none of the one or more channel resources include data to be decoded when the plurality of channel coherence metrics are below the threshold channel coherence value.

16. The apparatus of claim 9, wherein the received data comprises at least a pilot signal, and wherein the plurality of channel coherence metrics are determined based, at least in part, on the pilot signal.

* * * * *